(12) United States Patent
Droms et al.

(10) Patent No.: US 10,057,208 B2
(45) Date of Patent: Aug. 21, 2018

(54) VISIBILITY CONTROL FOR DOMAIN NAME SYSTEM SERVICE DISCOVERY

(71) Applicant: Cisco Technology, Inc., San Jose, CA (US)

(72) Inventors: Ralph Droms, Concord, MA (US); Timothy P. Donahue, Natick, MA (US)

(73) Assignee: Cisco Technology, Inc., San Jose, CA (US)

( * ) Notice: Subject to any disclaimer, the term of this patent is extended or adjusted under 35 U.S.C. 154(b) by 120 days.

(21) Appl. No.: 14/529,725

(22) Filed: Oct. 31, 2014

(65) Prior Publication Data

US 2016/0127305 A1    May 5, 2016

(51) Int. Cl.
*G06F 15/173* (2006.01)
*H04L 29/12* (2006.01)
*G06F 17/30* (2006.01)

(52) U.S. Cl.
CPC .... *H04L 61/1511* (2013.01); *G06F 17/30477* (2013.01); *G06F 17/30554* (2013.01); *H04L 61/1541* (2013.01)

(58) Field of Classification Search
CPC ............. H04L 61/1511; H04L 61/1541; G06F 17/30554; G06F 17/30477
USPC ........................................................ 709/223
See application file for complete search history.

(56) References Cited

U.S. PATENT DOCUMENTS

| | | |
|---|---|---|
| 6,154,777 A | 11/2000 | Ebrahim |
| 7,228,359 B1 | 6/2007 | Monteiro |
| 7,636,791 B2 | 12/2009 | Shimada |
| 8,130,718 B2 | 3/2012 | Shaheen |
| 8,161,184 B2 * | 4/2012 | Sekar ................... G06Q 20/382 235/380 |
| 8,897,952 B1 | 11/2014 | Palmer |
| 9,107,164 B1 * | 8/2015 | Troyanker ........ H04W 52/0229 |
| 2002/0105955 A1 | 8/2002 | Roberts |

(Continued)

FOREIGN PATENT DOCUMENTS

| | | |
|---|---|---|
| KR | 2013 0103145 A | 9/2013 |
| WO | WO2013/041350 | 3/2013 |

OTHER PUBLICATIONS

Cheshire, S. et al., "DNS Based Service Discovery", Internet Engineering Task Force, Request for Comments: 6763, dated Feb. 2013, 49 pages.

(Continued)

*Primary Examiner* — Joseph L Greene
(74) *Attorney, Agent, or Firm* — Hickerman Palermo Becker Bingham LLP

(57) ABSTRACT

Techniques are provided for performing domain name system (DNS) service discovery based on policy evaluations. In an embodiment, policy data is represented as DNS-SD records and is used to control visibility of services for service requesting devices. The policy data may describe policies for a particular type of a service or a particular service delivery unit. The visibility of service delivery units is determined through evaluations of the policies in policy data. In some embodiments, additional metadata may be retrieved to be used in the policy evaluations. In certain embodiments, based on the policy evaluations service data about only a subset of service delivery units available is returned to a service requesting device in response to a DNS-SD query.

20 Claims, 5 Drawing Sheets

(56) References Cited

U.S. PATENT DOCUMENTS

| | | |
|---|---|---|
| 2005/0030917 A1 | 2/2005 | Haller |
| 2005/0141568 A1 | 6/2005 | Kwak |
| 2007/0086382 A1 | 4/2007 | Narayanan |
| 2007/0202800 A1 | 8/2007 | Roberts |
| 2009/0083406 A1 | 3/2009 | Harrington |
| 2013/0173769 A1* | 7/2013 | Seastrom ............ H04L 61/1552 709/223 |
| 2014/0019641 A1* | 1/2014 | Kitamura ................ H04L 12/66 709/244 |
| 2014/0214958 A1* | 7/2014 | Cheshire ............. H04L 61/1511 709/204 |
| 2014/0310811 A1 | 10/2014 | Hentunen |
| 2015/0074221 A1* | 3/2015 | Kuparinen ........ H04L 29/12066 709/214 |
| 2015/0089061 A1* | 3/2015 | Li ....................... H04L 61/1511 709/226 |
| 2015/0142968 A1* | 5/2015 | Bhagwat ................. H04L 67/16 709/224 |
| 2015/0256404 A1* | 9/2015 | Evans .................... H04L 67/16 709/224 |
| 2016/0036762 A1 | 2/2016 | Droms et al. |
| 2017/0317968 A1 | 11/2017 | Droms |

OTHER PUBLICATIONS

U.S. Appl. No. 14/447,475, filed Jul. 30, 2014, Office Action, dated Jun. 10, 2016.

International Searching Authority, "Search Report", in application No. PCT/US2015/038367, dated Sep. 30, 2015, 9 pages.

Claims in application No. PCT/US2015/038637, dated Sep. 2015, 5 pages.

Droms, U.S. Appl. No. 14/447,475, filed Jul. 30, 2014, Corrected Notice of Allowability, dated Apr. 10, 2017.

Droms, U.S. Appl. No. 14/447,475, filed Jul. 30, 2014, Notice of Allowance, dated Mar. 15, 2017.

U.S. Appl. No. 14/447,475, filed Jul. 30, 2014, Final Office Action, dated Oct. 28, 2016.

\* cited by examiner

VISIBILITY CONTROL FOR DOMAIN NAME SYSTEM SERVICE DISCOVERY

FIELD OF THE DISCLOSURE

The present disclosure relates to communication networks. The disclosure relates more specifically to visibility control for domain name system (DNS) discovery.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

A domain name system (DNS) query is generally used to obtain an Internet Protocol (IP) address corresponding to a particular domain name and associated with a particular device in a network. A standard DNS query may also facilitate service discovery. A standard DNS query may be constructed to discover instances of a desired service available within a network or domain. This type of service discovery is referred to as DNS-based Service Discovery (DNS-SD).

DESCRIPTION OF EXAMPLE EMBODIMENTS

Figure 1:
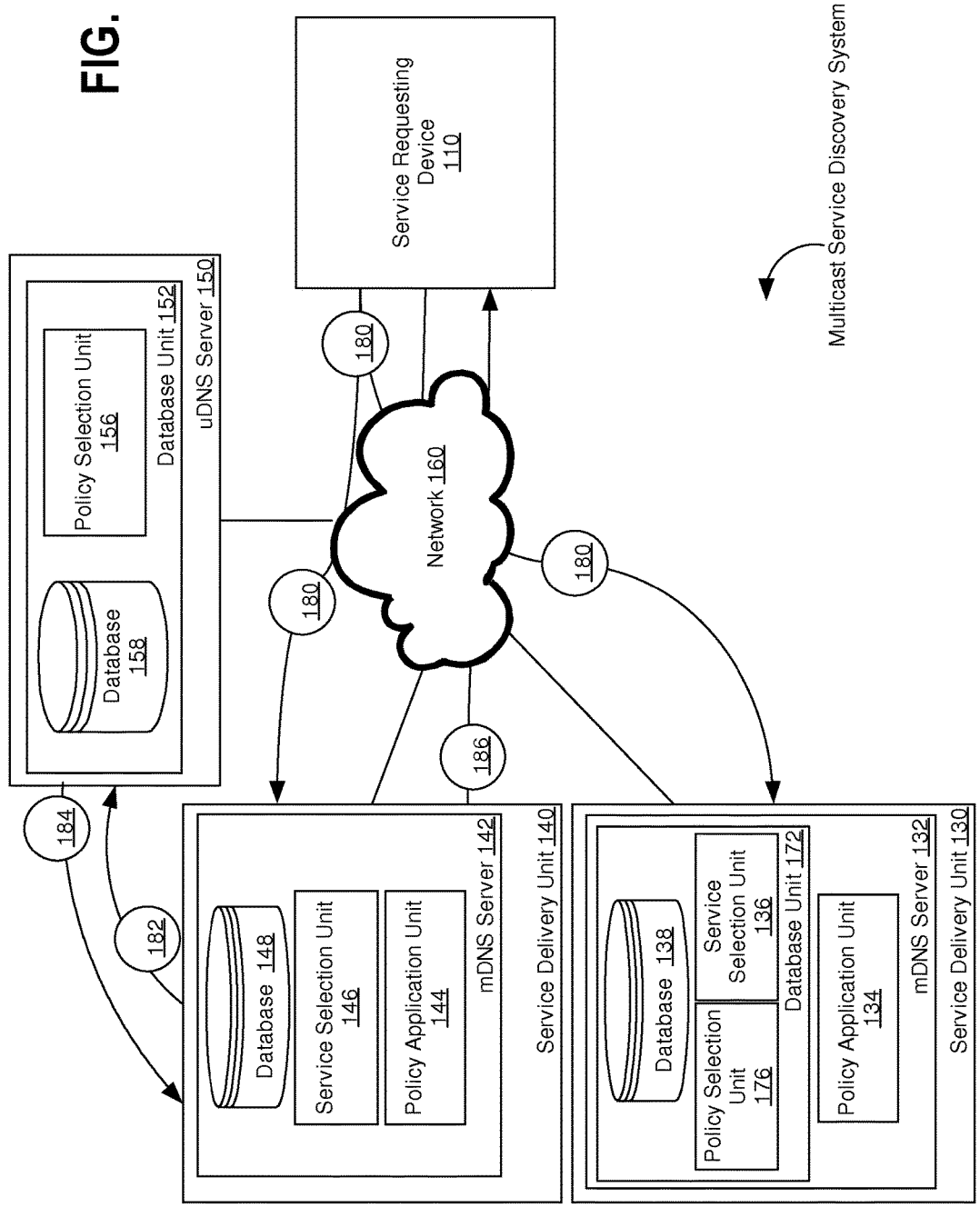
FIG. 1 illustrates an example of a multicast service discovery system according to some embodiments.

In the following description, for the purposes of explanation, numerous specific details are set forth in order to provide a thorough understanding of the present disclosure. It will be apparent, however, that the present disclosure may be practiced without these specific details. In other instances, well-known structures and devices are shown in block diagram form in order to avoid unnecessarily obscuring the present disclosure.

1.0 Overview

In an embodiment, a data processing apparatus comprises one or more database units each comprising DNS service data that associates service namespace data with service identifying data, and DNS policy data that associates the service namespace data with policy data specifying one or more policies that is configured to control visibility of services for computing devices that are defined in the service identifying data; one or more transceivers coupled to the database units, wherein each of the transceivers is configured to receive a Domain Name System (DNS) query from a particular computing device, wherein the DNS query defines a service namespace that includes a service domain name; one or more processors coupled to each of the one or more database units and the one or more transceivers; a service selection unit coupled to the one or more processors and configured to select a plurality of services, from among the service identifying data in the DNS service data, based on the service namespace in the DNS query; a policy selection unit coupled to the one or more processors and configured to select a policy, from the DNS policy data, based on the service namespace in the DNS query; a policy applying unit coupled to the one or more processors and to the one or more transceivers and configured to apply the policy and to output a selected subset of the plurality of services; wherein the one or more transceivers are configured to transmit information about the subset of the plurality of services to the computing device.

In an embodiment, a method comprises storing DNS service data that associates service namespace data with service identifying data, and DNS policy data that associates the service namespace data with policy data specifying one or more policies that is configured to control visibility of services for computing devices that are defined in the service identifying data; receiving a Domain Name System (DNS) query from a particular computing device, wherein the DNS query defines a service namespace that includes a service domain name; selecting a plurality of services, from among the service identifying data in the DNS service data, based on the service namespace in the DNS query; selecting a policy, from the DNS policy data, based on the service namespace in the DNS query; applying the policy and to output a selected subset of the plurality of services; transmitting information about the subset of the plurality of services to the computing device that are also referred herein as "service requesting devices."

2.0 Structural and Functional Examples

In an embodiment, a programmatic method allows performing dynamic Domain Name System (DNS)-based Service Discovery (DNS-SD) using standard Domain Name System (DNS) queries. A device wishing to discover a list of available instances of a particular service type generates a standard DNS-SD query. The DNS-SD query is sent to a DNS server via at least one relay machine or computer. Metadata describing or associated with the requesting device may also be provided with the DNS-SD query to or at the DNS server.

In response to a DNS query associated with DNS-SD, a responding computer provides a list of device instances specified by the requesting device that are capable of providing a desired service specified by the requesting device. The requesting device specifies, in the DNS query, the type of desired service and the specific domain in which the requesting device is looking for that service. For example, the requesting device may be looking for printer services within its local domain and may send a DNS query to find out which printer services are available in the network. If a second device also makes the same DNS query, the same list of device instances is returned to this second device; the same DNS query generally returns the same response.

However, not every service in the response list should be allowed for access by or be presented to the requesting device. For example, in a scholastic environment, school administrators may wish to restrict visibility of the printing service in a school dean's office. Such services may need to be only visible via DNS SD to devices associated with the dean and her immediate staff.

In one embodiment, techniques are provided for performing domain name system (DNS) service discovery based on policy evaluations. In an embodiment, policy data is represented as DNS-SD records and is used to control visibility of services for service requesting devices. The policy data may describe policies for a particular type of a service or a particular service delivery unit. The visibility of service delivery units is determined through evaluations of the policies in policy data. In some embodiments, additional metadata may be retrieved to be used in the policy evaluations. In certain embodiments, based on the policy evaluations service data about only a subset of service delivery units available is returned to a service requesting device in response to a DNS-SD query.

DNS-SD may be performed in a de-centralized or centralized environment. In the de-centralized case, also referred to as multicast DNS, DNS-SD is performed without involving a centralized repository. Instead, a device looking for a particular type of service multicasts a DNS query to all devices in its accessible network. Those devices within the network capable of providing the particular type of service respond to the requesting device. Thus, the response to the multicast DNS query comprises a list of device instances within the accessible network having the desired service. A particular instance from the list of device instances may then be selected to access the desired service.

In the centralized case, also referred to as unicast DNS, DNS-SD is performed using a centralized repository, such as a DNS server. A device looking for a particular type of service in a particular domain sends a unicast a DNS query to the DNS server. The DNS server returns a list of device instances within the particular domain having the desired service. In practice, the DNS server may be one computer in a hierarchy of computers, and a first DNS server in the hierarchy may fail-over the request to the next computer in the hierarchy if the first does not have responsive data.

In an embodiment, multicast DNS may function without a central DNS server; however, using multicast DNS may limit the discovery of device instances capable of the desired service. For example, a multicast transmission may be configured to reach only local network devices, thus the scope of responsive data may be limited to the local network of the requesting device. As such, the device attempting to discover a particular service may not receive information about all of the services of interest. With a unicast DNS configuration, a requesting device may query for supported services from a unicast DNS that is beyond the local network because such requests are not limited by the configuration of multicast addresses. Also, the unicast DNS may include information on services accessible on one or more sub-networks that may extend beyond the local network of the requesting device.

In an embodiment, the DNS server performs a selection of instances of the particular service type within the domain named in the DNS-SD query. The DNS server retrieves the policy associated with the instances of the particular service type and applies the policy based on the metadata. Thus, in some embodiments, DNS server policy data along with the metadata may be the source of constraints on the scope relevant data returned in a discovery response. In certain embodiments, metadata comprises one or more characteristics associated with and/or describing the device, an account, a user, or an environment. The policy data may comprise a policy description that the DNS server may interpret and apply on the instances of services available based on metadata.

The techniques described herein may provide a way for a DNS server to return a subset of services available in a requested domain based on policy data applications. In certain embodiments, the approach allows storage of policy data containing the policies in resource record (RR) formats, referred to herein as "DNS RR." The DNS RRs may also be referred to as DNS-SD records or DNS-SD RRs, and RRs may also be referred to as records. Additional details about DNS RRs are provided in *Internet Engineering Task Force* (*IETF*), *Request for Comments* (*RFC*) *6763, DNS-Based Service Discovery*, February 2013 (hereinafter "*RFC 6763*") and the reader is presumed to be familiar with that document for purposes of understanding the disclosure herein.

Even without changes to the service discovery requests or the DNS-SD query or the RR format, the techniques described herein may provide a way to flexibly restrict the visibility of services available at the DNS server. Consequently, if the same query is made by two different devices, each of the two devices may receive a different list of instances because policy may yield different visibility for the two devices, and/or the metadata associated with each of the two devices may be different from each other. If the same query is made by the same device in two different device states, then the query may also cause a different list of instances to be returned each time, if the policy has changed in the meantime.

Various modifications to the embodiments will be readily apparent to those skilled in the art, and the generic principles defined herein may be applied to other embodiments and applications without departing from the spirit and scope of the disclosure. Moreover, in the following description, numerous details are set forth for the purpose of explanation. However, one of ordinary skill in the art will realize that embodiments of the disclosure may be practiced without the use of these specific details. In other instances, well-known structures and processes are not shown in block diagram form in order not to obscure the description of the disclosure with unnecessary detail. Thus, the present disclosure is not intended to be limited to the embodiments shown, but is to be accorded the widest scope consistent with the principles and features disclosed herein.

2.1 Multicast Service Discovery System Example

FIG. 1 is a computer system diagram depicting a multicast service discovery system, in an embodiment. Each of the elements of FIG. 1 may be implemented in various embodiments, using one or more computer programs, other software elements, digital logic such as ASICs or FPGAs, each of which is configured using instructions, gates or logic to perform the functions described herein during use or execution, in either a general-purpose or a special-purpose computer system.

In an embodiment, a computer system 100 includes a unicast DNS server (also termed a uDNS server) 150, service delivery units 130 and 140, network 160, and service requesting device 110. The uDNS server 150, service delivery units 130 and 140, and service requesting device 110 include one or more transceivers that are used to connect each to one another through network 160. In real-world implementation embodiments of a multicast service discovery system, there may be numerous service delivery units or service requesting devices, as well as more than one uDNS servers.

Service delivery units in the multicast service discovery system are configured to receive and process DNS-SD queries from service requesting devices. Thus, service delivery units may include DNS servers that are configured to process DNS-SD queries. Accordingly, service delivery unit 130 includes multicast DNS server (mDNS server) 132, and service delivery unit 140 includes mDNS server 142, respectively. The mDNS servers allows service delivery to describe to a service requesting device the services that each of the service delivery units provides. Service data, which describe the services that may be provided, are stored in DNS-SD records on database 138 and database 148 respectively. Service requesting device 110 may issue a DNS-SD query to a multicast network address. Network 160 may route the DNS-SD query to the service delivery units on network 160 that are registered to receive requests from the multicast network address. If service delivery unit 140 and service delivery unit 130 are registered to receive requests sent to the multicast address, both service delivery units may receive the same DNS-SD query issued by service requesting device 110.

Service selection units 136 and 146 are configured to process DNS-SD queries from service requesting devices and select service data that identifies the services provided on the corresponding service delivery unit, from RRs in databases 138 and 148, respectively. Policy application units 134 and 144 are configured to then apply corresponding policies to the service data returned by service selection unit 136 and 146, respectively, to select the services that may be visible for requesting service device 110 based on the corresponding policies.

To retrieve the corresponding policies, in one embodiment, a service delivery unit may issue DNS-SD queries to a uDNS server. The uDNS server 150 may include database unit 152 that contains database 158 that stores RRs representing policy data for services available on network 160. Policy selection unit 156 may process received DNS-SD queries and select the policy data for the corresponding policies from database 158. The uDNS Server 150 may then respond to the request with the policy data.

Additionally or alternatively, in an embodiment, mDNS server may itself contain policy data. In such embodiment, a policy selection unit and a service selection unit may be part of the same database unit. For example, database unit 172 on mDNS server 132 contains policy selection unit 176, service selection unit 136 and database 138. Database 138 is used to store both policy data as well as service data in DNS-SD records. Policy selection unit 176 may be configured to select the policy data for the corresponding policies for policy application unit 134. Policy application unit 134 may apply the corresponding policies for determining the selected services' visibility for service requesting device 110.

The service data, for the services that are determined to be visible for service requesting device 110, may be returned to service requesting device 110 in response to the original DNS-SD query.

For example, multicast service discovery system 100 may include service delivery unit 130 that offers a media streaming service and service delivery unit 140 that offers a printing service using Internet Printer Protocol (IPP). Service requesting device 110 may submit a DNS-SD query 180 to a known multicast address on network 160 to discover devices with IPP services. Network 160 delivers DNS-SD query to service delivery unit 130 and service delivery unit 140 that are registered to receive the requests submitted to the multicast address on network 160. Service delivery unit 130 services media streams and contains mDNS server 132 that advertises this service. Upon the receipt of the DNS-SD query 180, mDNS server 132 processes the query using service selection unit 136. Service selection unit 136 queries database 138 using the information from the query. Since, database 138 contains no records corresponding to IPP printing service, mDNS server 132 returns no records and service delivery unit 130 either responds with empty records to the query or does not respond at all.

In this example, service delivery unit 140 also receives the DNS-SD query 180 from the multicast request of service requesting unit 110. Upon the receipt, mDNS server 142 processes the query using service selection unit 146. Service selection unit 146 queries database 148 using the information from the query. Since service delivery unit 140 provides an IPP service, database 148 contains RR records advertising the IPP service. Thus, database 148 returns those records in response to the request from service selection unit 146.

The mDNS server 142 may determine whether the IPP service is allowed to be visible for service requesting device 110. To do so, in certain embodiments, policy application unit 144 submits DNS-SD query 182 to uDNS server 150 connected to network 160 to retrieve policies for the IPP service. Upon receipt of the query by uDNS server 150, policy selection unit 156 of database unit 152 processes the DNS-SD query. If any RRs that contain the policy for the IPP service are returned, uDNS server returns the records in response 184. Upon receipt of the response by service delivery unit 140, policy application unit 144 applies the policy data in the response to the records retrieved for the IPP service from database 148. If it is determined that the IPP service is visible to service requesting device 110, the records corresponding to those service are returned in response 186.

2.2 Unicast Service Discovery System Example

Figure 2:
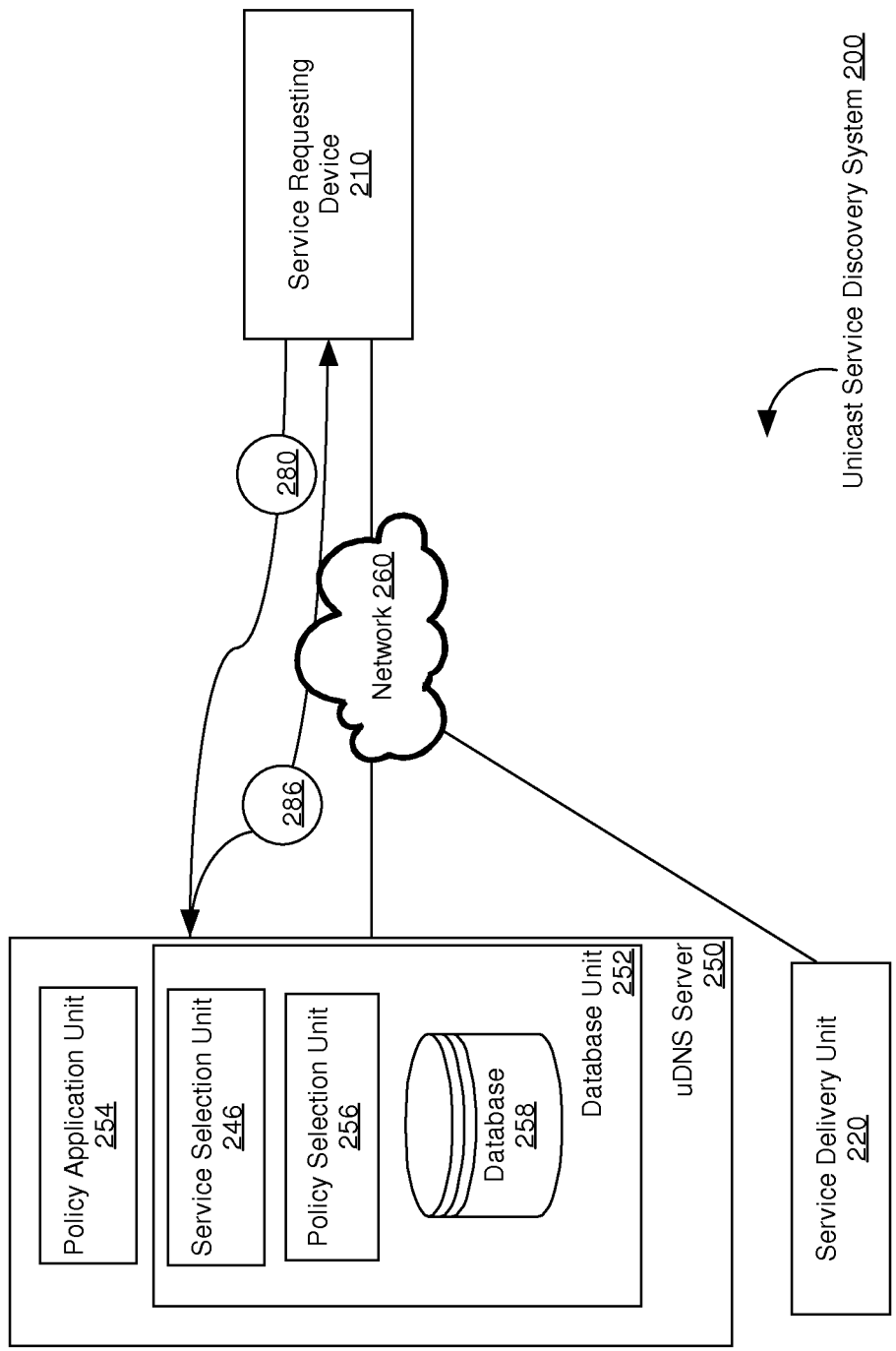
FIG. 2 illustrates an example a unicast service discovery according to some embodiments.

FIG. 2 is a system diagram depicting a unicast service discovery system 200, in an embodiment. System 200 includes unicast DNS server (uDNS server) 250, service delivery units 220, network 260, and service requesting device 210. uDNS server 250, service delivery units 220 and service requesting device 210 include one or more transceivers that are configured to connect each device to one another through network 260. In real-world implementation embodiments of a unicast service discovery system, there may be numerous service delivery units or service requesting devices, as well as more than one uDNS servers.

uDNS server 250 is configured to receive and respond to DNS-SD queries from service requesting device 210. uDNS Server 250 includes database unit 252 to retrieve data necessary for processing the received DNS-SD queries. In certain embodiments, database unit 252, itself, contains policy selection unit 256, service selection unit 246 and database 258 that stores DNS-SD records. Policy selection unit 256 is configured to retrieve policy data from database 258, and service selection unit 246 is configured to retrieve service data from database 258. Policy application unit 254 is configured to apply policies corresponding to the retrieved policy data to the services in the service data and select the services that are visible for requesting service devices.

For example, unicast service discovery system 200 may contain service delivery unit 220 that offers a printing service using Internet Printer Protocol (IPP), and service requesting device 210. Service requesting device 210 may submit a DNS-SD query 280 to uDNS server 250 to discover devices with IPP services. Based on a received query, service selection unit 246 determines whether database 258 contains RRs describing an IPP service. Service selection unit 246 retrieves service data from the database identifying among other service delivery unit 220. Policy selection unit 256 retrieves from database 258 policy data describing the policies for the IPP service retrieved, and policy application unit 254 applies the policy. If it is determined that the any of the retrieved IPP service are visible to service requesting device 210, then the records corresponding to those service are returned in response 286.

2.3 Service Discovery System Additional Examples uDNS servers 150 and 250 comprise one or more servers, computers, processors, or databases configured to communicate with the devices connected to network 160 and 260, respectively. uDNS servers 150 and 250, and mDNS servers 132 and 142 may be located at one or more geographically distributed locations. The DNS servers may store and maintains a plurality of DNS resource records (RRs) that map domain names to Internet Protocol (IP) and Internet Protocol Version 6 (IPv6 or IP6) addresses. The DNS RRs also include information about the respective resources associated with IP/IP6 addresses in pointer (PTR), service locator (SRV), and text (TXT) records, and the like.

In an embodiment, DNS servers may include a service discovery synthesizer to facilitate the extraction of metadata about service requesting devices. The service discovery synthesizer and metadata extraction techniques may be implemented as described in U.S. patent application Ser. No. 14/447,475, filed Jul. 30, 2014. Metadata may include an identifier for a service requesting device, a user information making a DNS-SD request, a geo-location of the service requesting device or the user, an organizational affiliation for an entity associated with the service requesting device, the user's organizational affiliation, a timestamp for sending or receiving the DNS query, current load statistics for available services, availability of the services, connection information of the service requesting device such as connection characteristic or type. In certain embodiments, metadata is retrieved from a service requesting device and in other embodiments, from other devices that contain information about the service requesting device or the connection. For example, metadata may be retrieved from a dynamic host control protocol (DHCP) server that the service requesting device has registered with.

In a related embodiment, a DNS server may extract metadata by a reverse DNS lookup of a network address of a service requesting device and may use the metadata in policy application. Reverse DNS lookup refers to retrieving the domain name, such as fully qualified domain name (FQDN), of a network address. The network address may be an internet address based on Internet Protocol v4 (IPv4) or Internet Protocol v6 (IPv6). Since DNS servers contain mappings of domain names to network address, the DNS servers may be used for reverse DNS lookup. The reverse DNS lookup in a service discovery system may be performed by the DNS server servicing DNS-SD query or by another DNS server connected to the same network. When a DNS server receives a DNS-SD query from a service requesting device, the DNS server may obtain the network address of the service requesting device. By performing, the reverse DNS lookup locally or at a remote DNS server, the DNS server may obtain the FQDN of the service requesting device. The obtained FQDN may be used as metadata in determination of policy application to DNS-SD query results. For example, if a policy restricts visibility of a service returned by a DNS-SD query to a particular domain, then depending whether the obtained FQDN of a service requesting device is within the particular domain, the service may not be visible to the service requesting device and may not be returned in response to the DNS-SD query.

Databases 138, 148, 158 and 258 may each comprise one or more databases or storage devices for storing data and/or instructions for use by the respective DNS servers of which they are part of. The databases may include DNS RRs as well as additional data associated with DNS RRs (for which no standard records have been defined), or other information associated with the mapped resources. In some embodiments, one or more processors of the respective DNS servers may be coupled to the corresponding databases. In an alternative embodiment, the databases may be configured to communicate with the respective DNS servers through the respective network.

Service requesting devices 110 and 210 comprise computing devices. Examples of the devices that may be used in various embodiments include work stations, personal computers, general purpose computers, laptops, Internet appliances, hand-held devices, wireless devices, wired devices, portable devices, wearable computers, cellular or mobile phones, portable digital assistants (PDAs), smart phones, tablets, multi-processor systems, microprocessor-based or programmable consumer electronics, game consoles, set-top boxes, network PCs, mini-computers, and the like. Each of the service requesting devices includes applications, software, or instructions to facilitate DNS-SD queries described herein. Service requesting devices may be located geographically dispersed from each other and/or other components in a service discovery system. Service requesting devices 110 and 210 are also referred to as clients, hosts, requesting devices, requesting clients, requesting hosts, requesting machines, requestors, and the like.

Service delivery units 130, 140 and 220 comprise computing devices capable of providing one or more services (or one or more types of services) requested by service requesting devices, including but not limited to, printers, facsimile machines, scanners, photocopiers, displays, projectors, televisions, set-top boxes, gaming consoles, multi-media consumption devices, video output devices, audio output devices, storage devices, input devices, output devices, network services devices, network management systems, software-defined networking (SDN) controllers, mobility controllers, authentication servers, time servers, Internet of Things-type devices, thermostats, light switches, refrigerators, dishwashers, coffee makers, washers, dryers, building security controller, residential or commercial building appliances, or other service-providing devices. Service delivery units 130, 140 and 220 include applications, software, or instructions to facilitate DNS-SD described herein and to communicate with DNS server and service requesting devices. Service delivery units are also referred to as service providing devices, service providing clients, service providers, targets, target devices, and the like.

Networks 160 and 260 comprise a communications network, such as any combination of a local area network (LAN), a wireless LAN (WLAN), a wide area network (WAN), a wireless WAN (WWAN), a metropolitan area network (MAN), an ad hoc network, an intranet, an extranet, a virtual private network (VPN), a portion of the Internet, the Internet, a portion of a public switched telephone network (PSTN), or a cellular network.

2.4 DNS-SD Records

DNS-SD records may describe mappings of service data to policy data, in an embodiment. Service data includes service namespace data and service identifying data. The service namespace data describes information about types of services offered. The service namespace data may include the domain names where a particular type of a service is provided and the communication protocols that the particular type of service utilizes. In some embodiments, service namespace data may describe the type of service with such detail as to limit it to a particular service delivery unit information. In such embodiments, service namespace data may have the same value as service identifying data for a service delivery unit.

The service identifying data provides information about service delivery units. The service identifying data may also include the protocol and domain information but for a particular service delivery unit. The service identifying data includes names of service delivery units as well as connection information to allow a service requesting device to connect to a particular service delivery unit.

Policy data in DNS-SD records may describe policy information for service discovery. Policy data may provide whether a type of service or a service delivery unit is visible to requests from certain service requesting devices. Policies in policy data may be defined through describing constraints on the metadata extracted from requests of service requesting devices or retrieved from elsewhere. In an embodiment, policy data may describe constraints on domain name of service requesting device. In some embodiments, a policy in policy data may be evaluated to granting the visibility of a service based on matching the domain with the policy data while, in other embodiments, the policy in the policy data may be evaluated as denying the visibility of the service based on matching the domain of the service requesting device with the domain in the policy data.

Policy data may also describe constraints on geographic locations of service requesting devices or their organizational affiliation, user identities and request timestamps, in certain embodiments. For example, a policy constraint on a media streaming service discovery may be set to deny visibility to any discovery request that came after midnight to prevent any disturbance at night. Thus, if a discovery request is received for the media streaming service after midnight, the policy is evaluated to deny the visibility of the service, and the response to the service requesting device of the service discovery does not include the media streaming service. In other embodiments, policies for services in policy data may be defined through describing constraints on the metadata about services. For example, policy data may describe ranges for current loads of a service or current availability of a service. If a requested service for a discovery is within the load boundaries or is marked as currently available in the policy data for the service, the policy is evaluated as granting the visibility for the requested service.

In an embodiment, policy data may describe whether the visibility for a service is granted or denied by default. Policy data may contain a default value denoting whether to deny or grant a request for the service information. If other policy data exists that may be used to evaluate the policy for the service based on the metadata of the request, such evaluation may take precedence over the default policy. For example, the default policy data may indicates that the default policy is to deny visibility for a requested service. However, another policy data may exist that denotes that for a particular domain of service requesting devices, the policy is evaluated to grant visibility for the requesting service. In this example, if the domain of a requesting device is within the particular domain, then the policy overwrites the default policy and grants visibility to the requested service for the service requesting device.

In an embodiment, policy data may be stored in DNS-SD PTR type records. In another embodiment, policy data may be stored in DNS-SD TXT type records. In other embodiments, other type of records and record formats may be used to store policy data.

Figure 3:
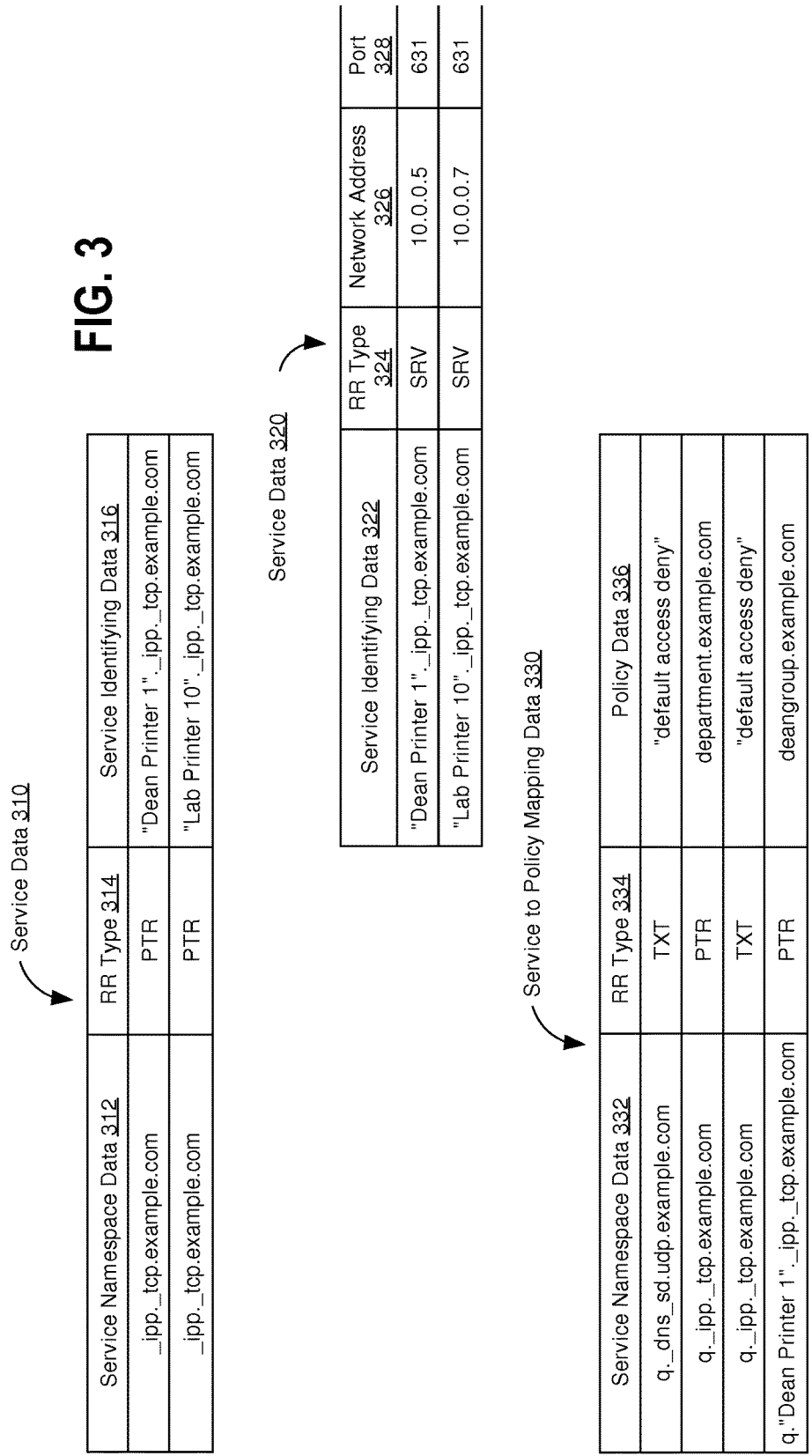
FIG. 3 illustrates an example of DNS-SD records.

FIG. 3 depicts DNS records for service and policy data, in an embodiment. *RFC* 6763 describes the canonical form for DNS-SD records. DNS-SD records for service data 310 may include service namespace data 312, RR type 314 and service identifying data 316. Service namespace data 312 describes the service types and domains that the service is available for. For example, "_ipp._tcp.example.com" describes that an IPP service is available for "example.com" domain. RR type 314 (as well as, RR type 324 and RR type 334) describes the DNS record type as described in *RFC* 6763. Service identifying data 316 describes names for service delivery unit: "Dean Printer 1" and "Lab Printer 10." The connection information for those service delivery units is stored in SRV records of service data 320. Service data 320 describes mapping of service identifying data 322 for a service to connection information for the service. The connection information may include network address 326 and port 328.

Service to policy mapping data 330 of FIG. 3 includes mappings of service namespace data 332 to policy data 336. Service described in service namespace data 332 may be visible upon the evaluation of the corresponding policy described in policy data 336. For example, 'q._dns_sd.udp.example.com TXT "default access deny"' record represents a default policy of denying access to any DNS-SD request over the UDP protocol in the "example.com" domain. Such the default policy may be overwritten by more detailed policy definition in service namespace data 332. For example, 'q._ipp._tcp.example.com TXT "default access deny"' record represents a default policy of denying visibility of IPP services over TCP/IP within "example.com" domain. As another example, "q._ipp._tcp.example.com PTR department.example.com" may specify that although the default policy is to deny visibility of the IPP services, the services may be visible for service requesting devices from "deparment.example.com" domain.

Service to policy mapping data 330 may contain policy for a particular service delivery unit as well. For example, q."Dean Printer 1"._ipp._tcp.example.com PTR deangroup.example.com" record may represent that the "Dean Printer 1" IPP service delivery unit may be visible for service requesting devices that are in "deangroup.example.com" domain.

In a DNS-SD record, service namespace data for mapping to policy data may be prefixed with a prefix denoting that the record is for policy data mapping. The prefix may comply with requirement described in *RFC* 6763. In one embodiment the prefix may be "q.", however, the exact protocol or combination of prefixes used for denoting service namespace data for mapping to policy data is not critical to the techniques described herein.

2.5 Functional Examples

DNS query for service discovery may be constructed using special DNS fully qualified domain names (FQDNs), which are composed of one of five special prefixes and an appropriate DNS domain, and requesting SRV records. There are five special prefixes reserved for configuration of the service discovery browsing domain, as set forth in *RFC* 6763:

b._dns-sd._udp.
db._dns-sd._udp.
r._dns-sd._udp.

dr._dns-sd._udp.
lb._dns-sd._udp.
For an example domain named "example.com," the associated RR names would be:
b._dns-sd._udp.example.com.
db._dns-sd._udp.example.com.
r._dns-sd._udp.example.com.
dr._dns-sd._udp.example.com.
lb._dns-sd._udp.example.com.

And by performing PTR record requesting queries for these RR names, the conventional query results comprise:

For b._dns-sd._udp. (also referred to as the b.query): service identifying data comprising a list of domains recommended for browsing.

For db._dns-sd._udp. (also referred to as the db.query): service data comprising a single recommended default domain for browsing.

For r._dns-sd._udp. (also referred to as the r.query): service data comprising list of domains recommended for registering services using Dynamic Update.

For dr._dns-sd._udp. (also referred to as the dr.query): service data comprising a single recommended default domain for registering services.

For lb._dns-sd._udp. (also referred to as the lb.query): service identifying data comprising the "legacy browsing" or "automatic browsing" domain or domains.

Reference is made to *RFC* 6763 for additional details relating to the special prefixes.

Figure 4:
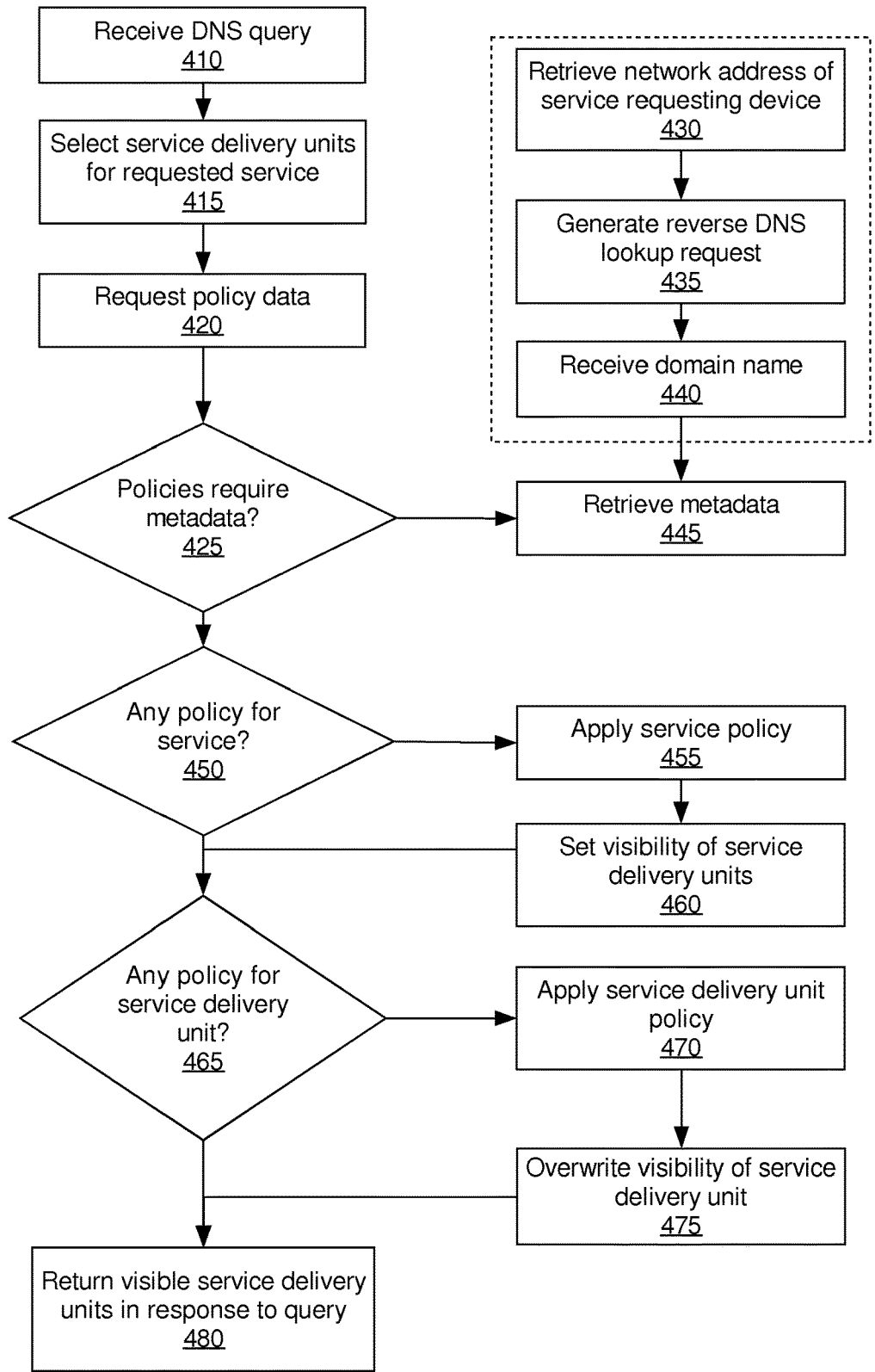
FIG. 4 illustrates an example flow diagram for DNS service discovery according to some embodiments.

FIG. 4 is a flow diagram depicting a process of performing DNS service discovery, in an embodiment. FIG. 4 may be understood to illustrate an algorithm and/or basic instructions for preparing computer programs to implement the subject matter of FIG. 4. In other words, FIG. 4 may be used as guidance for the structure and processes of computer programs that implement the functions that are now described with reference to the drawing.

At block 410, a DNS server receives a DNS-SD query from a service requesting device. For example, a service requesting device with FQDN of "LabPC1.department.example.com" may issue a service discovery query "_ipp._tcp.example.com". Such query requests a DNS server to return all IPP printing services available over TCP/IP protocol in "example.com" domain.

At block 415, the DNS server selects the DNS-SD records from service data that corresponds to the query. For example, if "_ipp._tcp.example.com" is executed on the DNS server that includes DNS-SD records depicted in FIG. 3, then the DNS server selects records in service data 310 where service namespace data 312 matches the query FQDN. Therefore, the result would include service identifying data 316 that identifies service delivery units: "Dean Printer 1" and "Lab Printer 10."

At block 420, based on the DNS-SD query from the service requesting device, policy data is requested for the requested service and for the selected service delivery units. In one embodiment, the policy data may be retrieved from DNS-SD records stored locally. In another embodiment, the policy data may be requested from a remote server. In an embodiment, a DNS-SD query may be used that would identify the request for policy data by using a reserved prefix.

A query for policy data may be generated for each of the requested services as well as each service delivery units selected as a result of executing the original query. For instance, continuing with the example above, queries for policy data are generated for DNS-SD and IPP service: "q._dns_sd.udp.example.com", "q._ipp._tcp.example.com," as well as, for Dean Printer 1 and Lab Printer 1: "q."Dean Printer 1"._ipp._tcp.example.com", "q."Lab Printer 10"._ipp._tcp.example.com". The policies may then be returned in form of DNS-SD records of service to policy mapping 330 of FIG. 3.

In certain embodiments, certain service delivery units may not have specific policy for visibility associated. In such embodiments, the visibility of service delivery unit is controlled by the policies of services requested. In FIG. 3 example, "Lab Printer 10" does not have any policy associated, and thus, the query "q."Lab Printer 10"._ipp._tcp.example.com" will not return any DNS-SD records. However, the visibility of "Lab Printer 10" would be evaluated based on the IPP service visibility for the service requesting device.

At block 425, the retrieved policy data for the requested services and the service delivery units is examined for determining whether any metadata is required for policy evaluations. In an embodiment, the type of a DNS-SD record used to store may indicate whether metadata is required for the evaluation of the policy described in the DNS-SD record. For example, if DNS-SD record is of a PTR type, then the domain of the service requesting device may be retrieved for the evaluation of the policy. If the policies indicated in policy data require metadata, at block 445, the required metadata is retrieved using metadata extraction techniques described in the above-referenced U.S. patent application Ser. No. 14/447,475.

In an embodiment, the retrieved policy data may indicate that the domain of the service requesting device is required. At block 430, the network address of the service requesting device is extracted from the received DNS-SD request. At block 435, the network address is used to generate a reverse DNS lookup request for the extracted network address. The reverse DNS lookup request may be issued locally on the DNS server or send to another DNS server in form of a query. At block 440, the domain name for the service requesting device is received to be used as metadata for policy evaluations. For example, the domain name for the service requesting device in the above example is requested through reverse DNS lookup request and in response, "LabPC1.department.example.com" is returned for the domain name.

At block 450, the returned policy data is evaluated to contain any service level policies. If so, then the service policies specified in the policy data are applied to determine the visibility of the selected service delivery units. The policy is evaluated using the policy data and the retrieved metadata. Based on the evaluation, the selected service delivery units are set as visible or hidden for the service requesting device.

Continuing with the above example, the policy data 336 of FIG. 3 contains policies for DNS-SD service and IPP service, thus those policies are evaluated. The DNS-SD service policy DNS-SD record contains "q._dns_sd.udp.example.com TXT "default access deny"", which indicates that by default all the responses to any service delivery requests should show no services. Therefore, this policy yields that "Lab Printer 10" and "Dean Printer 1" are marked hidden for service requests. Since the DNS-SD query is for IPP service, next the IPP service policy DNS-SD records are evaluated: "q._ipp._tcp.example.com TXT "default access deny"", and "q._ipp._tcp.example.com PTR department.example.com". Evaluating the default policy first, yields that both service delivery units are marked as hidden. The PTR record in policy data 336 triggers the retrieval of metadata, the domain of the service requesting device. Since "department.example.com" is part of the service requesting device's domain name, "LabPC1.department.example.com," the IPP service policy is evaluated to allow the visibility of IPP services for the service requesting device. Thus, both "Lab Printer 10" and "Dean Printer 1" service are marked visible for the request of the service requesting device.

At block 465, the returned policy data is evaluated to determine whether the policy data contains any specific policies for each of the selected service delivery units. If so, then, at block 470, the policy for the service delivery unit is evaluated. Based on the evaluation, at block 475, the visibility for the service delivery unit may be overwritten. For example, if a service level policy evaluation has marked a service delivery unit as visible but the policy for the policy for the service unit has been evaluated to make the service hidden, then the service delivery unit is evaluate as hidden for the request. At block 480, the service data for the selected service delivery units that have been determined to be visible for the service requesting device, are returned in response to the original DNS query.

Continuing with the example above, the policy data 336 of FIG. 3 contains policies for "Dean Printer 1" service delivery unit. Since the policy data is represented as PTR record containing the domain name, the domain name metadata from the service requesting device is used in the policy evaluation. The domain name in the DNS-SD PTR record for "Dean Printer 1" in Policy Data 336 contains "deangroup.example.com". The domain name for the service requesting device is determined to be "LabPC1.department.example.com" and, thus, does not contain "deangroup.example.com". Therefore, the policy is evaluated to hide "Dean Printer 1" IPP service from the service requesting device, and the previous policy evaluations are overridden for the "Dean Printer 1" IPP service. Accordingly, based on the service and policy data in FIG. 3, the service delivery unit "Dean Printer 1" is marked as hidden and "Lab Printer 10" is marked as visible. The service data for "Lab Printer 10" service delivery unit is then returned to the service requesting device.

3.0 Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
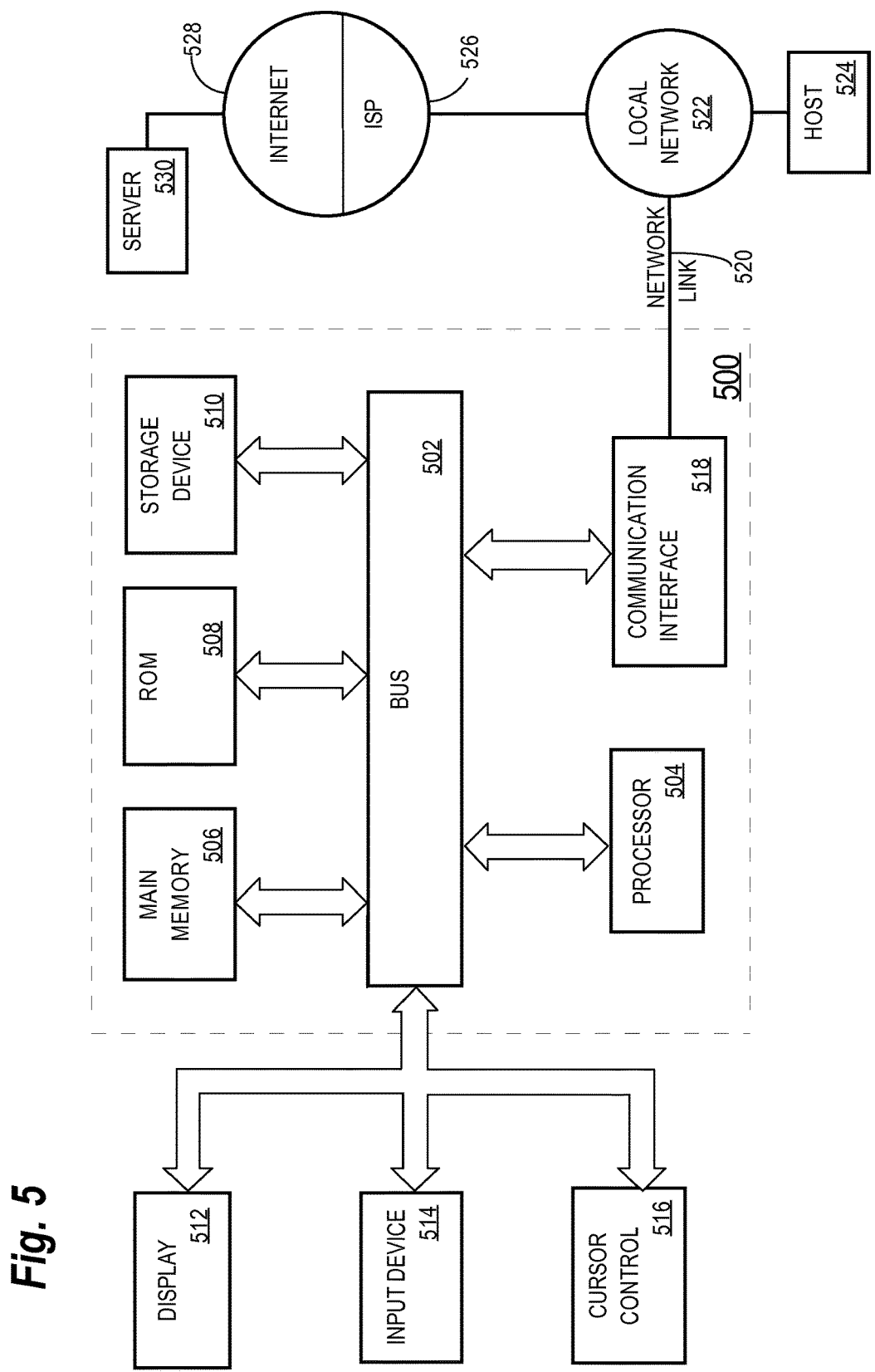
FIG. 5 illustrates a block diagram of an example computer system upon which embodiments of the present disclosure may be implemented.

For example, FIG. 5 is a block diagram that illustrates a computer system 500 upon which an embodiment of the disclosure may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT) or liquid crystal display (LCD), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media.

For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

4.0 Extensions and Alternatives

In the foregoing specification, embodiments of the disclosure have been described with reference to numerous specific details that may vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction.

What is claimed is:

1. A data processing apparatus, comprising:
   one or more database units each storing thereon:
      domain name system (DNS) service data that associates service namespace data with service identifying data that identifies accessible services, and
      DNS policy data that associates the service namespace data with policy data specifying one or more policies and that is configured to control visibility of services for computing devices that are specified in the service identifying data;
   one or more transceivers coupled to the database units, wherein each of the transceivers is configured to receive, from a particular computing device, a DNS query to discover one or more services, wherein the DNS query is configured to access resource records in canonical form comprising the service namespace data indicating a service namespace that includes a service domain name;
   one or more processors coupled to each of the one or more database units and the one or more transceivers;
   one or more memory units storing one or more instructions, which when executed by the one or more processors cause:
   in response to receiving, from the particular computing device, the DNS query to discover one or more services, executing the DNS query to discover one or more services by:
      using a service selection unit that is coupled to the one or more processors, selecting a plurality of accessible services, from among the service identifying data in the DNS service data, based on the service namespace in the DNS query,
      using a policy selection unit coupled to the one or more processors, selecting a policy, from the DNS policy data, based on the service namespace indicated in the DNS query, and
      using a policy applying unit coupled to the one or more processors and to the one or more transceivers, applying the policy to generate particular service identifying data that identifies a subset of accessible services selected from the plurality of accessible services;
   using the one or more transceivers, transmitting to the particular computing device, a response, to the received DNS query to discover one or more services, that includes the particular service identifying data that identifies the subset of accessible services selected from the plurality of accessible services.

2. The apparatus of claim 1, wherein the DNS query includes metadata about the particular computing device and wherein the one or more processors executing instruction that cause, using the policy applying unit, applying the policy using the metadata.

3. The apparatus of claim 2, wherein the metadata comprises at least one of an identity value that identifies the particular computing device, a user identity value, a geographic location value specifying a geo-location of the computing device, an organizational affiliation value specifying an entity associated with the computing device, a user organizational affiliation value, a timestamp value indicating a date or time of day of receiving the DNS query, load values indicating current loads of the plurality of accessible services, availability values specifying current availabilities of the plurality of accessible services, a connection value specifying a connection characteristic of the computing device, or a connection type value specifying a connection type of the computing device.

4. The apparatus of claim 1, wherein the one or more database units are configured to store the DNS policy data in DNS resource records (RRs) comprising the policy associated with an entry that contains the service domain name.

5. The apparatus of claim 1, wherein the one or more database units are configured to store the DNS policy data in DNS pointer resource records comprising the policy as a domain name associated with an entry that contains the service domain name.

6. The apparatus of claim 5, further comprising a FQDN processing unit coupled to the one or more processors, the one or more processors executing one or more instructions to cause:
  determining fully qualified domain name of the particular computing device;
  applying the policy by comparing the fully qualified domain name with the service domain to select the subset of the plurality of accessible services.

7. The apparatus of claim 6, wherein the one or more processors executing one or more instructions to cause, using the FQDN processing unit, determining the fully qualified domain name of the particular computing device by performing a reverse DNS lookup.

8. The apparatus of claim 1, wherein the DNS query is a Domain Name System-based Service Discovery (DNS-SD) query that is received on a multicast connection.

9. The apparatus of claim 8, further comprising a service delivery unit that is to provide one or more services from the subset of the plurality of accessible services to the computing device.

10. The apparatus of claim 9, wherein the DNS query is a DNS unicast query, and the apparatus further comprising a DNS server computer comprising the one or more processors executing one or more instructions that cause storing the DNS policy data and selecting the policy based on the DNS unicast query.

11. The apparatus of claim 1, wherein the apparatus is a unicast DNS server computer.

12. A method comprising:
  storing domain name system (DNS) service data that associates service namespace data with service identifying data that identifies accessible services, and DNS policy data that associates the service namespace data with policy data specifying one or more policies that is configured to control visibility of services for computing devices that are specified in the service identifying data;
  receiving, from a particular computing device, a DNS query to discover one or more services, wherein the DNS query is configured to access resource records in canonical form comprising the service namespace data indicating a service namespace that includes a service domain name;
  in response to receiving, from the particular computing device, the DNS query to discover one or more services, executing the DNS query to discover one or more services by:
    selecting a plurality of accessible services, from among the service identifying data in the DNS service data, based on the service namespace in the DNS query,
    selecting a policy, from the DNS policy data, based on the service namespace indicated in the DNS query, and
    applying the policy to generate particular service identifying data that identifies a subset of accessible services selected from the plurality of accessible services;
  transmitting, to the particular computing device, a response, to the received DNS query to discover one or more services, that includes the particular service identifying data that identifies the subset of accessible services selected from the plurality of accessible services;
  wherein the method is executed on one or more computing devices.

13. The method of claim 12, wherein the DNS query includes metadata about the particular computing device and the method further comprising applying the policy using the metadata.

14. The method of claim 13, wherein the metadata comprises at least one of an identity value that identifies the particular computing device, a user identity value, a geographic location value specifying a geo-location of the computing device, an organizational affiliation value specifying an entity associated with the computing device, a user organizational affiliation value, a timestamp value indicating a date or time of day of receiving the DNS query, load values indicating current loads of the plurality of accessible services, availability values specifying current availabilities of the plurality of accessible services, a connection value specifying a connection characteristic of the computing device, or a connection type value specifying a connection type of the computing device.

15. The method of claim 12, wherein the DNS policy data is stored in DNS resource records (RR) comprising the policy associated with an entry that contains the service domain name.

16. The method of claim 12, wherein the DNS policy data is stored in DNS pointer resource records comprising the policy as a domain name associated with an entry that contains the service domain name.

17. The method of claim 16, further comprising:
  determining fully qualified domain name of the particular computing device;
  applying the policy by comparing the fully qualified domain name with the service domain to select the subset of the plurality of services.

18. The method of claim 17, wherein determining the fully qualified domain name of the particular computing device comprises performing a reverse DNS lookup.

19. The method of claim 12, wherein the DNS query is a Domain Name System-based Service Discovery (DNS-SD) query that is received on a multicast connection.

20. The method of claim 12, wherein the DNS query is a Domain Name System-based Service Discovery (DNS-SD) query that is received on a unicast connection.

* * * * *